Patented May 30, 1939

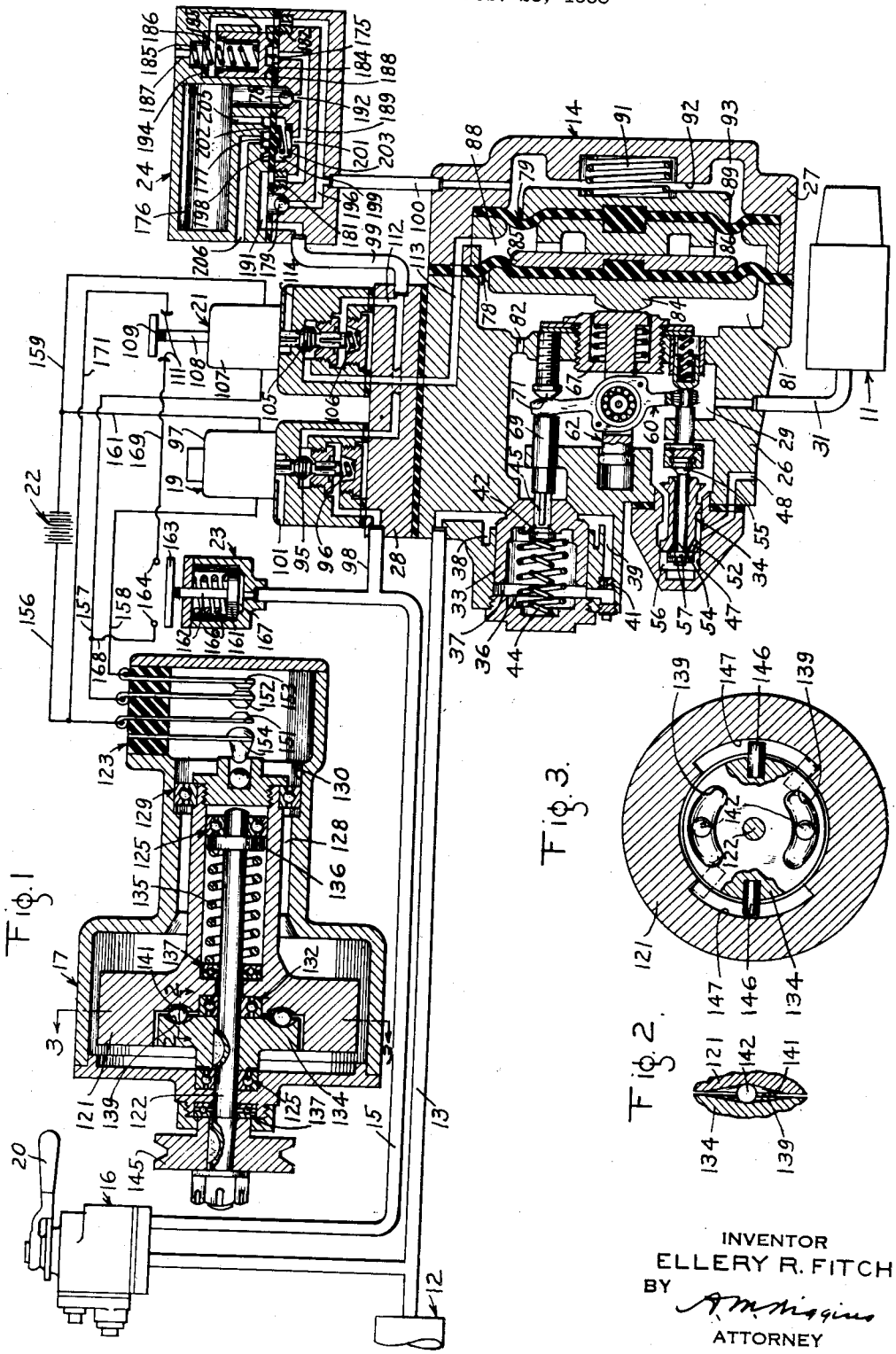

2,160,191

UNITED STATES PATENT OFFICE 2,160,191

BRAKE CONTROL MEANS

Ellery R. Fitch, Irwin, Pa., assignor to The Westinghouse Air Brake Company, Wilmerding, Pa., a corporation of Pennsylvania Application February 26, 1938, Serial No. 192,720

14 Claims. (Cl. 303—21)

This invention relates to brake control means and particularly to brake control means for guarding against sliding of the wheels of a vehicle, such as a railway car or train.

In the copending application Serial No. 192,516, of Richard L. Nash, filed February 25, 1938, and assigned to the assignee of the present application, there is disclosed a brake control equipment including a wheel-slip responsive device and an electropneumatic valve mechanism controlled by the wheel-slip responsive device in such manner as to effect the release of the brakes on a wheel which begins to slip and the reapplication of the brakes thereon after the wheel returns fully to a speed corresponding to vehicle speed due to the release of the brakes. The wheel-slip responsive device of the above-mentioned copending application is of such nature as to be conditioned to cause reapplication of the brakes on a slipping wheel momentarily when the slipping wheel changes from deceleration to acceleration and also to be conditioned to effect reapplication of the brakes as the vehicle wheel approaches a speed corresponding to vehicle speed. Operation of the electropneumatic valve mechanism is delayed, however, for a limited time after the wheel-slip responsive device is conditioned to cause reapplication of the brakes, by means of electrical timing means, in order to prevent the momentary reapplication of the brakes when a slipping wheel changes from deceleration to acceleration and until the vehicle wheel returns fully to a speed corresponding to vehicle speed.

It is an object of my present invention to provide a brake control equipment of the character disclosed in the above-mentioned copending application and having a different type of timing mechanism for delay in operation of the electropneumatic valve mechanism in response to operation of the wheel-slip responsive device.

More specifically it is an object of my invention to provide pneumatic timing means, as distinguished from electrical timing means, to delay operation of the electropneumatic valve mechanism in response to operation of the wheel-slip responsive device.

The above objects and other objects of my invention which will be made apparent hereinafter, are attained by means of a brake control equipment subsequently to be described and shown in the accompanying drawing, wherein, Fig. 1 is a simplified diagrammatic view, with parts thereof in section, showing a brake control equipment embodying my invention, and Figs. 2 and 3 are sectional views, taken on the lines 2—2 and 3—3, respectively, of Fig. 1, showing details of construction of the wheel-slip responsive device shown in Fig. 1.

Before proceeding to a description of the brake control equipment embodying my invention, it should be understood that "slipping" of a vehicle wheel refers to rotation of a vehicle wheel at a speed less than a speed corresponding to vehicle speed and that "sliding" of a vehicle wheel refers only to the dragging of a vehicle wheel along the track in a locked-wheel or non-rotative state.

Description of equipment

Referring to Fig. 1, the equipment shown comprises a brake cylinder 11, a source of fluid under pressure such as a main reservoir 12, a supply pipe 13 connected to the main reservoir 12, an electropneumatic control valve device 14 operatively controlling the supply of fluid under pressure from the supply pipe to the brake cylinder 11 and controlling the release of fluid under pressure from the brake cylinder 11, a control pipe 15 the pressure in which is controlled by a self-lapping brake valve device 16, and an inertia device 17 operative in response to slipping of a vehicle wheel for controlling the supply of fluid under pressure from the control pipe 15 to the control valve device 14, and its release from the control valve device, to control the operation of the control valve device.

The control valve device 14 includes two electromagnetically operated valve devices 19 and 21, hereinafter referred to as magnet valve devices, the energization of which is effected by current supplied from a source of current, such as a storage battery 22 under the control of the inertia device 17 and also, in part, under the control of a pressure operated switch 23, in the manner to be hereinafter described.

According to my invention, I provide a pneumatic timing device 24 which functions to delay operation of the control valve device 14 under certain conditions, as will be explained hereinafter.

Considering the parts of the equipment in detail, the control valve device 14 is of the type described and claimed in copending application Serial No. 137,956 of Clyde C. Farmer filed April 20, 1937, now Patent 2,140,620 assigned to the assignee of the present application. It comprises a relay valve section 26, a diaphragm section 27 and a magnet valve section 28 including the magnet valve devices 19 and 21.

The portion of the casing embodying the relay valve section 26 has formed therein a chamber 29, hereinafter referred to as the pressure chamber, to which the brake cylinder 11 may be constantly connected as by a pipe and passage 31. The pressure in the pressure chamber 29 is under the control of a self-lapping valve mechanism including a main supply valve 33 and a main release valve 34. The main supply valve 33 is in the form of a valve piston which operates slidably in a suitable bore in the casing and is urged toward a seated position on an associated valve seat by a coil spring 36 which is contained a chamber 37 at one side of the supply valve. An annular chamber 38, formed at the outer seated area of the supply valve 33, is connected to the supply pipe and passage 13. The chamber 37 is connected to the annular chamber 38 through a passage 39 containing a choke 41. Since the supply pipe 13 is constantly charged to the pressure of main reservoir 12, it will be seen that the main supply valve 33 is urged to a seated position by the pressure of the fluid in chamber 37 supplied thereto from the supply pipe 13 as well as by the force of spring 36.

A pilot supply valve 42 is carried on the main supply valve 33 and is provided with a fluted stem 45 which operates slidably in a bore in the main supply valve and extends into the pressure chamber 29. A coil spring 44 disposed concentrically within the coil spring 36 acts on the pilot valve 42 to seat it on a valve seat formed on the main supply valve 33 and yieldingly resists unseating thereof.

So long as the pilot valve 42 is seated on the main supply valve 33 the combined force of the fluid pressure in the chamber 37 and of the spring 36 acts to maintain the main supply valve 33 seated. When the pilot valve 42 is unseated, however, the fluid under pressure in the chamber 37 is vented rapidly past the pilot valve into the pressure chamber 29, the choke 41 preventing the influx of fluid under pressure to the chamber 37 except at a restricted rate. The fluid pressure force acting to seat the main supply valve 33 is thus reduced to effect so-called "unloading" of the main supply valve, that is reduction of the force necessary to unseat the valve.

The main release valve 34 has a tubular body adapted to be shifted slidably in a suitable bore 47 in the casing, the bore 47 being open at one end to the pressure chamber 29 and, at an intermediate point, to atmosphere through a passage and port 48. The main release valve 34 is normally in the position shown, wherein it is unseated from an associated valve seat formed on the casing, to open the bore 47 to the pressure chamber 29 and is shiftable in the left-hand direction, as viewed in the drawing, to seated position. Formed on the main release valve 34 is a piston 51 having a restricted port 52 therein through which fluid under pressure trapped in the chamber 56 at the left of the piston may leak away to atmosphere, thereby preventing dashpot action of the release valve.

Slidable in the central longitudinal bore in the main release valve 34 is a stem or rod 54 carrying a so-called pilot release valve 55 which is adapted to seat on a valve seat formed on the main release valve 34 when the rod 54 is shifted in the left-hand direction. A nut and lock nut 57 on the end of the rod 54 in the chamber 56 limits the degree of movement of the rod 54 in the right-hand direction to unseat the pilot valve 55.

The main and pilot supply valves 33 and 42 and the main and pilot release valves 34 and 55 are operated by a mechanism including a lever 60 which is pivotally mounted intermediate the ends thereof on a plunger 62 slidably mounted in the casing. A coil spring 67 is arranged, as in the manner shown, to urge the plunger 62 in the right-hand direction and to yieldingly resist movement of the plunger 62 in the left-hand direction.

One end of the pivoted lever 60 engages a stop screw 71 on the casing and is effective when shifted in the left-hand direction from the stop screw to engage a slidable stem 69 which in turn engages the fluted stem 45 of the pilot supply valve 42 to cause unseating of the pilot valve.

The opposite end of the lever 60 is formed as a yoke and straddles a reduced portion of the rod 54 so as to effect shifting of the rod 54 in either direction corresponding to the movement of this end of the lever.

The diaphragm section of the control valve device 14 comprises two unconnected movable abutments or diaphragms 78 and 79 suitably clamped along the periphery thereof in the casing and disposed in spaced coaxial relation with each other in axial alignment with the plunger 62. The diaphragms 78 and 79 are of different effective pressure areas and, for purposes of illustration, it may be assumed that the diaphragm 79 has an effective pressure area which is seventy-five per cent of the effective pressure area of the diaphragm 78. One side of the larger diaphragm 78 is open to a chamber 81 in the relay valve section 26 which is in open communication with the pressure chamber 29 through a relatively large passage 82.

A follower plate or disk 83 is affixed to the face of the diaphragm 78 and is provided with a rounded projection 84 which engages the end of the plunger 62. Affixed to the diaphragms 78 and 79 within a chamber 88 formed between the diaphragms are follower plates or members 85 and 86, respectively, which are adapted to engage in contacting relation. Affixed to the outer face of the diaphragm 79 in a chamber 93 formed in the casing is a follower plate or disk 89 which is normally spaced from an annular stop 92 on the casing by a spring 91 which urges the diaphragm 79 in the left-hand direction away from the stop.

It will be apparent that when both of the chambers 88 and 93 are charged with fluid under pressure, the largest diaphragm 78 is shifted in the left-hand direction to shift the plunger 62 correspondingly. The diaphragm 79 is not effective to exert a force on the plunger 62 in the left-hand direction because the fluid pressure forces on opposite sides thereof are balanced.

When the chamber 88 between the diaphragms 78 and 79 is at atmospheric pressure and fluid under pressure is supplied to the chamber 93 only then the fluid pressure force acting to shift the smaller diaphragm 79 in the left-hand direction also shifts the largest diaphragm 78 and consequently the plunger 62 in the left-hand direction.

Assuming that the plunger 62 is shifted in the left-hand direction from the position shown by fluid pressure force exerted on either one of the diaphragms 78 or 79 the lever 60 is first pivoted about its upper end in a clockwise direction to effect seating of the pilot release valve 55 and then seating of the main release valve 34, thereby closing the exhaust communication through passage 48 from the pressure chamber 29 to atmosphere. Thereafter, further movement of the plunger 62 in the left-hand direction causes the lever 60 to be pivoted about its lower end in a counterclockwise direction to effect unseating of the pilot supply valve 42. This unloads the main supply valve 33 so that when the plunger 62 moves further in the left-hand direction the main supply valve 33 is unseated with a relatively low force. Fluid under pressure is thus supplied from the supply pipe 13 to the pressure chamber 29 and acts in the chamber 81 on the larger diaphragm 78 to resist the fluid pressure force acting to shift the larger diaphragm 78 in the left-hand direction. When the pressure established in the pressure chamber 29 and chamber 81 substantially balances the fluid pressure force urging the plunger 62 in the left-hand direction, the spring 67 acts to shift the plunger 62 in the right-hand direction. The lever 60 is then pivoted on the plunger 62 in a clockwise direction by the force of the springs 36 and 44 tending to reseat the main supply valve and pilot supply valve, respectively, so that a force is exerted on the rod 54 tending to maintain the pilot release valve 55 and the main release valve 34 seated.

Accordingly, when the main supply valve 33 and the pilot supply valve 45 are again seated, the supply of fluid under pressure to the pressure chamber 29 and chamber 81 is cut off. Further movement of the plunger 62 in the right-hand direction by the spring 67 is therefore stopped, and, since the pilot release valve 55 and the main release valve 34 remain seated pressure in the pressure chamber 29 is maintained.

If the pressure of the fluid supplied to the chambers 88 and 93 or to chamber 93 only is increased, the fluid pressure force acting to shift the plunger 62 in the left-hand direction is increased correspondingly and the pilot and main supply valves 42 and 33 are thus again operated to supply fluid under pressure to the pressure chamber 29 and then reseated to cut off the further supply of fluid under pressure when the pressure in the chamber 81 substantially balances the fluid pressure force urging the diaphragm 78 in the left-hand direction.

In this connection it should be observed that because the diaphragm 79 is smaller than the diaphragm 78, the pressure established in the pressure chamber 29 by operation of the self-lapping valve mechanism will be proportionately lower for a given pressure of fluid acting on the diaphragm 79 as compared to the same pressure acting on the diaphragm 78.

When the operating force urging the plunger 62 in the left-hand direction is removed by the release of fluid under pressure from both chambers 88 and 93, the spring 67 returns the plunger 62 to the normal position shown and thus effects unseating of the pilot release valve 55. Fluid under pressure then flows from pressure chamber 29 to the chamber 56 thereby balancing the fluid pressure force in the chamber 29 tending to maintain the main release valve 34 seated so that when the nut 57 on the end of the rod 54 engages the valve 34 it is unseated with a relatively light force. With the main and pilot release valve 34 and 55 again both unseated, fluid under pressure is released from the chamber 29 to atmosphere by way of the exhaust port and passage 48.

Since the brake cylinder 11 is connected to the chamber 29, the brakes are applied to a degree determined by the pressure in the pressure chamber 29 and released upon the release of fluid under pressure from the pressure chamber 29.

The chambers 88 and 93 of the diaphragm section 27 of the control valve device 14 are charged with fluid under pressure from the control pipe 15 and fluid under pressure is released therefrom under the control of the magnet valve devices 19 and 21. The magnet valve 19 comprises a double beat valve 95 which is normally urged to an upper seated position by a spring 96 and which is shifted to a lower seated position against the yielding resistance of spring 96 by a suitable plunger, not shown, on which magnetic force is exerted upon energization of an electromagnet winding 97. When in its upper seated position as shown, the double beat valve 95 establishes communication from a branch pipe and passage 98 of the control pipe 15 to a passage and pipe 99 leading to the pneumatic timing device 24 which in turn controls the supply of fluid under pressure, in the manner to be subsequently described, through a pipe and passage 100 to the chamber 93 at the right of the smaller diaphragm 79. When the double beat valve 95 is in its lower seated position, the connection from the pipe and passage 98 to the passage and pipe 99 is closed, and the passage and pipe 99 is connected to an exhaust passage and port 101.

The magnet valve 21 is similar, in part, to the magnet valve 19 and comprises a double beat valve 105 which is normally urged into an upper seated position by a spring 106 and actuated to a lower seated position against the yielding resistance of the spring 106 by a plunger 108 upon energization of an electromagnet winding 107. The plunger 108 carries in insulated relation thereon, a contact-bridging member 109 which is normally out of engagement with a pair of associated fixed contact members 111 and which is adapted to be shifted downwardly into bridging contact therewith when the double beat valve 105 is shifted to its lower seated position. The contact-bridging member 109 when shifted into contact with the contact member 111 establishes a holding circuit for the electromagnet winding 107 of the magnet valve 21 in a manner and for a purpose to be explained later.

When the double beat valve 105 of the magnet valve 21 is in its upper seated position it establishes communication from a branch passage 112 of the passage 99 to a passage 113 leading to the chamber 88 between the two diaphragms 78 and 79. When the double beat valve 105 is in its lower seated position, the communication just described is closed and communication is established through which the passage 113 is connected to an exhaust port and passage 114.

It will thus be apparent that with the double beat valve 105 of the magnet valve 21 in its upper seated position, the magnet valve 19 controls the supply of fluid under pressure to and the release of fluid under pressure from both of the chambers 88 and 93. It will also be apparent that with the double beat valve 95 of the magnet valve 19 in its upper seated position, the magnet valve 21 is operative to effect the independent release of fluid under pressure from the chamber 88 between the diaphragms 78 and 79.

The brake valve device 16 is of the self-lapping type such as described and claimed in Patent 2,042,112 of Ewing K. Lynn and Rankin J. Bush. It comprises briefly, a valve mechanism effective when the operating handle 20 of the brake valve is in its normal brake release position, to exhaust fluid under pressure from the control pipe 15 and operative when the handle 20 is shifted into the application zone out of its normal release position to supply fluid under pressure from the supply pipe 13 to the control pipe 15 and establish therein a pressure corresponding to the degree of displacement of the operating handle 20 out of its normal release position. If the pressure in the control pipe 15 tends to reduce, due to leakage or for other reasons, below the pressure corresponding to the position of the operating handle, the valve mechanism is operative automatically to supply fluid under pressure to maintain such pressure in the control pipe 15.

The inertia device 17 is of the type described in detail in the above-mentioned Patent 2,140,620 and comprises an inertia element in the form of a fly-wheel 121, a driving shaft 122 for the fly-wheel and a switch device 123. The driving shaft 122 is suitably supported at opposite ends thereof as by ball bearings 125, one of which is retained in the end cover 126 of the casing and the other of which is slidably supported within a bore 127 in the laterally projecting hub portion 128 of the fly-wheel 121.

The hub portion 128 of the fly-wheel is supported by a ball bearing 129 in a bore 130 of the casing in such manner as to permit both rotary and sliding movement of the fly-wheel 121 in the casing. The main body portion of the fly-wheel 121 is rotarily and slidably supported on the shaft 122 as by a ball bearing 132 inset in a recess in the face of the fly-wheel.

Fixed to the shaft 122 exterior to the casing of the inertia device 17 is a pulley or sprocket wheel 145 and the shaft is adapted to be rotated according to the rotative speed of a vehicle wheel, on which the brakes are applied by the brake cylinder 11, as by an endless belt or chain connecting the pulley or sprocket wheel 145 to a similar pulley or sprocket wheel fixed on the axle of the wheel.

The fly-wheel 121 is rotated by rotation of the shaft 122 through a clutch arrangement comprising a disk 134 fixed to the shaft 122 and a coil spring 135 so interposed between a collar or flange 136 fixed to the shaft 122 within the hub portion 128 of the fly-wheel, and a shoulder on the fly-wheel at the inner end of the bore 127, as to urge the fly-wheel 121 and the disk 134 into interlocking engagement. Thrust bearings 137 are provided to sustain the axial thrust of the shaft 122 on the end cover 126 due to the spring 135, and also the thrust of the spring 135 on the fly-wheel 121.

As shown in Figs. 2 and 3, the disk 134 and fly-wheel 121 are interlocked by means of a plurality of spaced pairs of complementary registering recesses 139 and 141 in the adjacent faces of the disk 134 and fly-wheel 121, in each of which recesses is contained a steel ball 142. The recesses 139 and 141 are deepest at the mid-point thereof and slope in opposite directions from the mid-point to the face of the disk and fly-wheel 121 so that, under the influence of the spring 135 the steel ball 142 normally seats in the deepest point of the recess.

The force of spring 135 is such as to maintain the fly-wheel 121 and disk 134 in interlocking engagement, as shown, as long as either the disk 134 or the fly-wheel 121 does not accelerate or decelerate with respect to the other in excess of a certain rate, corresponding for example to a ten mile per hour per second retardation or acceleration of the vehicle wheel from which the shaft 122 is driven.

When the vehicle wheel driving the shaft 122 decelerates at a rate such as ten miles per hour per second, which rate will occur only when the wheel slips, or when the vehicle wheel accelerates at a rate of ten miles per hour per second, which will occur only when the vehicle wheel is accelerating back toward a speed corresponding to vehicle speed while slipping, the fly-wheel 121 shifts forwardly and backwardly, respectively, relative to the disk 134. In view of the steel balls 142 interposed between the disk and the fly-wheel, the forward or backward shifting of the fly-wheel 121 with respect to the disk 134 results in axial shifting of the fly-wheel 121 in the right-hand direction against the force of the spring 135.

The extent to which the fly-wheel 121 and the disk 134 may move rotatively relative to each other in opposite directions is limited, however, as by one or more pins 146 projecting beyond the periphery of the disk 134 and received in cooperating arcuate slots or grooves 147 in the fly-wheel 121.

The switch device 123 of the inertia device 17 may comprise a plurality of resilient contact fingers 151, 152 and 153, similar to those employed in telephone switches, mounted in a row in insulated relation and in axial alignment with the hub portion 128 of the fly-wheel. The contact fingers 151, 152 and 153 are normally spaced apart and disengaged from each other, as shown. When the fly-wheel 121 is shifted axially in the right-hand direction in the manner previously described, the end of the hub portion 128 engages and shifts a resilient finger 154 which in turn shifts the contact fingers 151, 152 and 153 so as to effect engagement first of the contact finger 151 with the contact finger 152 and then of the contact finger 152 with the contact finger 153.

The contact finger 151 is connected to one terminal, such as the positive terminal, of the battery 22 as by a wire 156, the contact finger 152 is connected to one terminal of the electromagnet winding 107 of the magnet valve 21 as by a wire 157, and the contact finger 153 is connected to one terminal of the electromagnet winding 97 of the magnet valve device 19 as by a wire 158. The remaining terminals of the electromagnet windings 107 and 97 are connected to the negative terminal of the battery 22 as by a wire 159 and branch wire 161.

It will thus be apparent when the contact fingers 151, 152 and 153 engage each other, circuits are established for energizing the electromagnet windings of the magnet valve devices 19 and 21.

When the electromagnet winding 107 of the magnet valve 21 is energized by engagement of contact fingers 151 and 152, the previously mentioned holding circuit therefor is established for maintaining it energized thereafter, as long as the pressure in the control pipe 15 exceeds a certain uniform low pressure. This is accomplished by means of the pressure switch 23, which is shown diagrammatically as comprising a casing containing a piston 161 having a stem 162 which carries in insulated relation thereon a contact-bridging member 163 adapted to engage a pair of fixed contact members 164. A coil spring 166, interposed between the piston and the casing, yieldingly urges the piston to an extreme position in one direction in which the contact-bridging member 163 disengages the contact members 164. On the side of the piston 161 opposite to the spring 166 is a chamber 167 to which the control pipe 15 is connected. Spring 166 is of such strength that when the pressure of the fluid supplied to the control pipe 15 and acting in the chamber 167 on the piston 161 exceeds a certain uniform low pressure, such as five pounds per square inch, the piston 161 is shifted against the yielding resistance of the spring 166 to cause the contact-bridging member 163 to engage the contact members 164.

One of the contact members 164 of the pressure switch 23 is connected by a branch wire 168 to the wire 157 leading to one terminal of the electromagnet winding 107 of the magnet valve device 21. The other contact member 164 is connected by a wire 169 to one of the contact members 111 of the magnet valve device 21. The other contact member 111 is connected to the positive terminal of the battery 22 as by a branch wire 171 of the wire 156.

It will thus be apparent that with the contact-bridging member 163 of the pressure switch 23 engaging the contact members 164, energization of the electromagnet winding 107 due to engagement of the contact fingers 151 and 152 of the inertia device 17 causes actuation of the contact-bridging member 109 of the magnet valve device 21 into contact with the contact members 111 to establish a holding circuit for maintaining the electromagnet winding 107 energized notwithstanding the subsequent separation of the contact fingers 151 and 152. This holding circuit extends from the positive terminal of the battery 22 by way of the wire 156, branch wire 171, contact members 111 and contact-bridging member 109 of the magnet valve 21, wire 169, contact members 164 and contact-bridging member 163 of the pressure switch 23, branch wire 168 and wire 157, electromagnet winding 107 of the magnet valve 21 and wire 159 to the negative terminal of the battery 22. The function of the holding circuit will be made apparent hereinafter.

The pneumatic timing device 24 comprises a casing containing a supply valve 175, a volume chamber 176, a release valve device 177 for releasing fluid under pressure from the chamber 176, two check valves 178 and 179 illustrated as of the ball type, and two chokes 181 and 182.

The supply valve 175 is in the form of a piston valve slidably operable in a suitable bore in the casing and normally yieldingly urged into seated relation on an annular gasket seat 184 by a spring 185 contained in a chamber 186 at one side of the supply valve which is constantly open to atmosphere through an exhaust port 187. The supply valve 175 is provided on the seating face thereof with an annular rib 188 which engages the gasket seat 184 in surrounding relation to the opening of a passage 189 through the gasket seat 184.

The passage 189 is connected through the choke 181 to a chamber 191 in the casing to which the passage and pipe 99 from the control valve device 14 is connected. The volume chamber 176 is connected to the passage 189 through a port 192 and the ball check valve 178 is arranged to prevent back flow of fluid under pressure from the chamber 176 to the passage 189 through the port 192.

When fluid under pressure is supplied into the pipe and passage 99 under the control of the magnet valve 19, the chamber 176 and choke 181 serve to delay for a certain limited time the build-up of fluid under pressure on the inner seated area of the supply valve 175. The spring 185 which urges the supply valve 175 to seated position is of such strength as to maintain the valve seated until the pressure established in the passage 189 and acting on the inner seated area of the valve exceeds a certain uniform pressure.

When the supply valve 175 is shifted upwardly due to the pressure of fluid in the passage 189, the increase in the area on the face of the valve resulting from the unseating of the valve results in a sudden increase in the force urging the valve upwardly and thus the valve is snapped upwardly into seated relation on an annular gasket seat 194. In this position, the valve 175 uncovers a port 195 opening out of a passage 196 to which the pipe and passage 100 leading from the chamber 93 of the control valve device 14 is connected. Thus, when the supply 175 is unseated, communication is established through which fluid under pressure supplied to the passage 189 flows to the chamber 93 of the control valve device 14.

The choke 182 is arranged in the passage 196 to restrict the rate of flow through the chamber 93 for a purpose which will be made apparent hereinafter. The passage 196 is open to the chamber 186 at the back of the supply valve 175 when the supply valve is seated on the lower gasket seat 184. When the supply valve 175 is shifted upwardly into seated relation on the upper gasket seat 194 this communication is closed.

The passage 196 is connected to the chamber 191 in the casing and the ball check valve 179 is arranged so as to prevent the flow of fluid under pressure from the chamber 191 to the passage 196 and so as to be unseated to permit the flow of fluid under pressure therepast at a rapid rate from the passage 196 and the connected chamber 93 of the control valve device 14 to the chamber 191.

The release valve device 177 controls the release of fluid under pressure from the volume chamber 176 and comprises a diaphragm valve 198 having a chamber 199 at one side thereof which is open to the passage 189 through a port 201. The diaphragm valve 198 is urged into seated relation on an annular rib seat 202 by the combined force of the fluid pressure in the chamber 199 and of a spring 203.

The volume chamber 176 is connected to the annular space at the outer seated area of the diaphragm valve, through a passage 205; and the space at the inner seated area of the valve is connected to atmosphere through an exhaust passage and port 206.

It will thus be seen that when the combined force of the spring 203 and the pressure in chamber 199 is greater than the force of fluid pressure in volume chamber 176 acting on the outer seated area of the diaphragm valve 198, the valve is maintained seated to prevent the release of fluid under pressure from the chamber 176. When the pressure of the fluid in the chamber 176 acting on the outer seated area of the diaphragm valve exceeds the combined force of the spring 203 and the pressure of the fluid in the chamber 199, the diaphragm valve 198 is unseated and fluid under pressure is then released from the volume chamber 176 to atmosphere through the exhaust passage 206.

*Operation of equipment*

Let it be assumed that the main reservoir 12 and the supply pipe 13 are charged to the normal pressure carried therein, as from a fluid compressor, not shown, and that the car or vehicle is traveling at a uniform speed under power or coasting with the brake valve handle 20 in its normal brake release position. It will be seen that with the brake valve handle in its release position and the control pipe 15 accordingly at atmospheric pressure, the pressure switch 23 is in its circuit-opening position; also that with the car traveling at a substantially uniform speed, the contact fingers 151, 152 and 153 of the inertia device 17 are disengaged from each other so that the magnet valve devices 19 and 21 of the control valve device 14 are deenergized and the chambers 88 and 93 of the control valve device 14 accordingly connected to the control pipe 15. Thus with the control pipe at atmospheric pressure the chambers 88 and 93 are also at atmospheric pressure, and the relay valve section 26 of the control valve device 14 is accordingly conditioned to exhaust fluid under pressure from the brake cylinder 11 and thereby effect release of the brakes.

To effect an application of the brakes, the operator of the vehicle shifts the brake valve handle 20 out of its normal release position into the application zone to a position corresponding to the desired degree of application of the brakes so that the control pipe 15 is charged to a corresponding pressure. When the pressure in the control pipe 15 exceeds a uniform low value, the contact-bridging member 163 of the pressure switch 23 is shifted to engage the contact members 164.

The magnet valves 19 and 21 of the control valve device 14 are deenergized and thus the charging of the control pipe 15 with fluid under pressure results in the rapid supply of fluid under pressure to the chamber 88 between the two diaphragms 78 and 79. The relay valve section 26 of the control valve device 14 is accordingly operated to establish a pressure in the brake cylinder 11 which is substantially equal to that established in the control pipe 15. Fluid under pressure is also supplied to the chamber 93 of the control valve device 14 but the supply is at first delayed by the pneumatic timing device 24 and then supplied at a restricted rate.

It will be seen that fluid under pressure supplied to the passage and pipe 99 flows to the chamber 191 of the pneumatic timing device 24 and thence through the choke 181 to the passage 189 and volume chamber 176, check valve 178 being unseated to permit the build-up of pressure in the volume chamber 176. After a limited interval of time, as determined by the size of the volume chamber 176 and the flow area of the restricted passage in the choke 181, the pressure in the passage 189 acting on the inner seated area of the supply valve 175 becomes effective to operate the supply valve to its supply position, in which fluid under pressure flows through the passage 196 at a rate determined by the flow area of the restricted passage in the choke 182 and through the pipe and passage 100 to the chamber 93. The flow area of the restricted passage in the choke 182 is smaller than that of the restricted passage in choke 181 in order to maintain sufficient pressure in the passage 189 and chamber 199 to maintain the diaphragm valve 198 of the release valve device 177 seated when the supply valve 175 is shifted to supply position.

The operation of the pneumatic timing device 24 to delay the build-up pressure in the chamber 93 of the control valve device 14 is not effective at this time to delay the operation of the control valve device 14 because it is operated, independently of the supply of fluid under pressure to the chamber 93, by the fluid pressure supplied to the chamber 88.

Let it now be assumed that due to the application of the brakes, the vehicle wheel with which the inertia device 17 is associated begins to slip. The inertia device 17 operates in response to the slipping of the vehicle wheel to effect engagement of the contact fingers 151, 152 and 153 in the manner previously described and thus energization of the two magnet valves 19 and 21 of the control valve device 14 is simultaneously effected. The fluid under pressure in the chambers 88 and 93 is thus rapidly vented to atmosphere under the control of the magnet valve devices 21 and 19 respectively. It will be understood that the check valve 179 of the pneumatic timing device 24 unseats to permit the rapid release of fluid under pressure from the chamber 93 through the pipe and passage 100 and passage and pipe 99 to atmosphere under the control of the magnet valve device 19. Being very sensitive to variations in the operating force therefor, the relay valve section 26 of the control valve device 14 is thus operated to rapidly exhaust fluid under pressure from the brake cylinder 11 to effect a complete release of the brakes on the slipping wheel.

The control valve device 14 operates so rapidly in response to the initiation of wheel slipping as to completely release the brakes on the slipping wheels in less time than it takes the slipping wheel to decelerate from a speed corresponding to the vehicle speed down to zero speed, that is, to the locked-wheel state. Thus, before reaching the locked-wheel state, the vehicle wheel ceases deceleration and begins to accelerate back toward a speed corresponding to vehicle speed.

As a result of the change from deceleration to acceleration of the slipping wheel, the fly-wheel 121 of the inertia device 17 changes from a leading to a lagging position with respect to the disk 134 on the driving shaft 122. Obviously, in changing from a leading to a lagging position, the fly-wheel 121 shifts momentarily in a left-hand axial direction to its normal position and then back in a right-hand axial direction. The fly-wheel 121 is only momentarily in its normal position but the contact fingers 151, 152 and 153 are nevertheless momentarily disengaged and, as a result, the energizing circuits for both of the magnet valve devices 19 and 21 of the control valve device 14 are momentarily interrupted. Due to the holding circuit, previously described, for the magnet valve device 21, the momentary disengagement of the contact fingers 151 and 152 of the inertia device 17 is ineffective to cause deenergization of the electromagnet winding 107 of the magnet valve device 21 and thus fluid under pressure is not resupplied to the chamber 88 between the diaphragms 78 and 79 of the control valve device 14.

However, the momentary deenergization of the magnet valve 19 resulting from the disengagement of the contact fingers 151, 152 and 153 causes fluid under pressure to be resupplied from the control pipe 15 to the pipe and passage 99 leading to the timing device 24. Due to the interval of time which elapses between the initiation of the supply of fluid under pressure into the passage and pipe 99 and the unseating of the supply valve 175 of the timing device 24, the contact members 151, 152 and 153 of the inertia device 17 are returned into contact with each other before the supply valve 175 is unseated. Thus the magnet valve 19 is again energized to release fluid under pressure from passage and pipe 99 before the supply valve 175 is unseated and, consequently, fluid under pressure is not supplied to the chamber 93 of the control valve device 14 as a result of the momentary separation of the contact fingers 151, 152 and 153 of the inertia device 17.

It will be seen, therefore, that the timing device 24 functions to prevent momentary resupply of fluid under pressure to the brake cylinder and consequently momentary reapplication of the brakes when the fly-wheel 121 of the inertia device 17 shifts from a leading to a lagging position with respect to the disk 134. If fluid under pressure were momentarily resupplied to the brake cylinder to effect momentary reapplication of the brakes while the vehicle wheel is slipping, it is likely that the vehicle wheel would decelerate rapidly to a locked-wheel state and therefore slide. By thus preventing the momentary reapplication of the brakes in the situation just described, the timing device 24 functions to insure against sliding of the vehicle wheels.

When the slipping wheel approaches a speed corresponding to vehicle speed and reduces in rate of acceleration sufficiently, the fly-wheel 121 of the inertia device 17 snaps back to its normal position shown in the drawing and disengagement of the contact fingers 151, 152 and 153 is effected. As in the previous instance, the holding circuit for the magnet valve device 21 prevents deenergization of the electromagnet winding of the magnet valve device 21 upon separation of the contact fingers 151 and 152. Thus, as long as the pressure in the control pipe 15 exceeds the certain uniform low pressure necessary for the pressure switch 23 to close, fluid under pressure cannot thereafter during the application of the brakes be resupplied to the diaphragm chamber 88.

Just as in the case of the previously described momentary separation of the contact fingers 151, 152 and 153 of the inertia device 17, the timing device 24 now functions to delay first the supply and then the build-up of the pressure in the chamber 93 due to the deenergization of the magnet valve device 19 and the consequent resupply of fluid under pressure from the control pipe 15 into the passage and pipe 99.

In this connection, it should be observed that the supply of fluid under pressure from the control pipe 15 to the diaphragm chamber 93 tends to reduce the pressure in the control pipe but the pressure maintaining characteristic of the brake valve 16 is effective to maintain the pressure in the control pipe 15 at a degree corresponding to the displacement of the operating handle 20 from its release position. Accordingly, the pressure switch 23 is maintained in circuit-closing position to maintain the holding circuit of the magnet valve device 21 and prevent the resupply of fluid under pressure to the diaphragm chamber 88.

It should now be apparent that since fluid under pressure is resupplied to only the diaphragm chamber 93, the pressure established in the brake cylinder 11 is less than the pressure in the brake cylinder at the time slipping of the wheels was initiated for, as previously explained, the diaphragm 79 is smaller than the diaphragm 78. If therefore, it be assumed that a pressure of fifty pounds per square inch was originally established in the control pipe 15 and brake cylinder 11, the pressure now restored in the brake cylinder 11 will be the percentage of fifty pounds per square inch that the area of the diaphragm 79 bears to the area of the diaphragm 78, that is seventy-five per cent of fifty pounds, or approximately thirty-seven pounds per square inch.

By thus restoring only partially the application of the brakes on the wheels which slip, recurrence of slipping thereof is rendered unlikely during the remainder of the application of the brakes.

The timing device 24 itself functions to further insure against recurrence of wheel slipping by delaying the reapplication of the brakes on a slipping wheel until the wheel returns fully to a speed corresponding to vehicle speed. It is possible that if the restoration of the brake application occurred slightly before the vehicle wheel attains a speed corresponding fully to vehicle speed, the wheel would again begin to slip. Once having attained a speed corresponding to vehicle speed, however, reapplication of the brakes is less likely to cause recurrence of wheel slipping. Obviously, the parts of the timing valve 24 may be suitably designed to secure any desired time interval of delay between the disengagement of the contact fingers 151, 152 and 153 of the inertia device 17 and the supply of fluid under pressure to the diaphragm chamber 93 of the control valve device 14, but this interval of time should in any case be of sufficient length as to prevent the reapplication of the brakes on a wheel which has slipped, until after it has fully returned to a speed corresponding to vehicle speed.

It will be apparent that the operator of the vehicle retains control of the degree of application notwithstanding the operation of the inertia device 17 to reduce brake cylinder pressure on a slipping wheel. Obviously, with magnet valve 19 deenergized and the supply communication from the control pipe 15 to the passage and pipe 99 opened, the variation of the pressure in the control pipe 15 by the brake valve 16 correspondingly varies the pressure in the diaphragm chamber 93 of the control valve device 14 and thus effects corresponding variation in the brake cylinder pressure.

After the vehicle is brought to a complete stop and it is desired to release the brakes before starting again, the operator merely returns the brake valve handle 20 to its normal release position to reduce the pressure in the control pipe 15 to atmospheric pressure. Fluid under pressure is accordingly exhausted from the diaphragm chamber 93 past the check valve 179, which is unseated, through the control pipe 15 to the brake valve 16 where it is released to atmosphere. The relay valve section 26 of the control valve device 14 thus operates to effect the complete exhaust of fluid under pressure from the brake cylinder and the consequent complete release of the brakes.

When the pressure in the control pipe 15 reduces sufficiently, pressure switch 23 is operated to interrupt the holding circuit for the magnet valve 21 and, as a result, the magnet valve 21 is deenergized.

When fluid under pressure is released from the chamber 93 of the control valve device 14, the pressure in the passage 189 of the timing device 24 is also correspondingly reduced through the two chokes 181 and 182. Accordingly, when the fluid under pressure trapped in the volume chamber 176 and acting on the outer seated area of the diaphragm valve of the release valve device 177 overcomes the combined force of the pressure in the chamber 199 and spring 203 the diaphragm valve 198 is unseated and the fluid under pressure released from the volume chamber 176 to render the timing valve 24 effective for subsequent operation. When the pressure acting to unseat the supply valve 175 is sufficiently reduced, the spring 185 becomes effective to reseat the supply valve on the lower gasket seat 184. In this position of the supply valve 175 the chamber 93 of the control valve device 14 is connected to atmosphere by way of the pipe and passage 100, passage 196, chamber 186 and exhaust port 187 of the timing device 24, thereby insuring the complete exhaust of fluid under pressure from the chamber 93.

*Summary*

Summarizing, it will be seen that I have disclosed a brake control equipment including a rotary inertia device responsive to slipping of a vehicle wheel and an electro-pneumatic relay valve device controlled by the inertia device for controlling the release and reapplication of the brakes; and including further, according to my invention, a pneumatic timing device for preventing operation of the electropneumatic relay valve device to effect reapplication of the brakes at any time during the slipping interval and until after the vehicle wheel returns fully to a speed corresponding to vehicle speed after having slipped.

While I have shown and described my invention in connection with a single brake cylinder, it will be apparent that the mechanism shown may be duplicated for other brake cylinders throughout a train of cars. It will be further apparent that various other additions, omissions or modifications may be made in the embodiment shown without departing from the spirit of my invention. It is accordingly not my intention to limit the scope of my invention except as it is necessitated by the scope of the prior art.

Having now described my invention, what I claim as new and desire to secure by Letters Patent, is:

1. A vehicle brake equipment comprising fluid pressure operated means responsive to the supply of fluid under pressure thereto to effect application of the brakes and to the release of fluid under pressure therefrom to effect release of the brakes, means providing a communication through which fluid under pressure is supplied to and released from the fluid pressure operated means, wheel-slip detecting means, a valve device controlled by the wheel-slip detecting means for controlling the supply of fluid under pressure through the said communication to the fluid pressure operated means and the release therefrom, and valve means normally closing the said communication between the valve device and the fluid pressure operated means and operative to open said communication in response to the pressure of fluid supplied into the communication under the control of the said valve device.

2. A vehicle brake equipment comprising fluid pressure operated means responsive to the supply of fluid under pressure thereto to effect application of the brakes and to the release of fluid under pressure therefrom to effect release of the brakes, means providing a communication through which fluid under pressure is supplied to and released from the fluid pressure operated means, wheel-slip detecting means, a valve device controlled by the wheel-slip detecting means for controlling the supply of fluid under pressure through the said communication to the fluid pressure operated means and the release therefrom, valve means normally effective to prevent the supply of fluid under pressure through the communication to the fluid pressure operated means, and timing means effective to cause operation of the said valve means to open the communication a certain limited time after said valve device is operated to open the communication.

3. A vehicle brake equipment comprising fluid pressure operated means responsive to the supply of fluid under pressure thereto to effect application of the brakes and to the release of fluid under pressure therefrom to effect release of the brakes, means providing a communication through which fluid under pressure is supplied to and released from the fluid pressure operated means, wheel-slip detecting means, a valve device controlled by the wheel-slip detecting means for controlling the supply of fluid under pressure through the said communication to the fluid pressure operated means and the release therefrom, valve means normally in a position to prevent the supply of fluid under pressure through the communication to the fluid pressure operated means and operative when the pressure of the fluid supplied into the said communication and acting thereon exceeds a certain uniform pressure to a position for opening the said communication to permit the supply of fluid under pressure to the fluid pressure operated means, and timing means for delaying for a limited time the build-up of pressure to exceed said certain pressure.

4. A vehicle brake equipment comprising fluid pressure operated means effective upon the supply of fluid under pressure thereto to effect application of the brakes and upon release of fluid under pressure therefrom to effect the release of the brakes, means providing a communication through which fluid under pressure is supplied to and released from the fluid pressure operated means, wheel-slip responsive means, a valve device normally in a position to permit the supply of fluid under pressure through the said communication and operated by the wheel-slip responsive means, upon slipping of a vehicle wheel, to a position for closing off the supply of fluid under pressure through the said communication and opening said communication to exhaust fluid under pressure from the fluid pressure operated means, and a valve mechanism adapted to prevent the supply of fluid under pressure through the communication to the fluid pressure operated means except after the elapse of a limited time and arranged to permit release of fluid under pressure from the fluid pressure operated means without delay.

5. A vehicle brake equipment comprising fluid pressure operated means operative upon the supply of fluid under pressure thereto to effect application of the brakes and upon the release of fluid under pressure therefrom to effect release of the brakes, means providing a communication through which fluid under pressure is supplied to the fluid pressure operated means and released therefrom, wheel-slip responsive means, a valve device controlled by the wheel-slip responsive means and operative upon slipping of a vehicle wheel to close said communication and to effect the release of fluid under pressure from the fluid pressure operated means and operative, as the slipping wheel accelerates toward vehicle speed, to a normal position opening said communication, and pneumatic timing means for delaying the supply of fluid under pressure to the fluid pressure operated means for a limited time after the said valve device is restored to its normal position, the limited time being at least long enough for the slipping wheel to return to a rotative speed corresponding substantially to vehicle speed.

6. A vehicle brake equipment, comprising fluid pressure operated means operative upon the supply of fluid under pressure thereto to effect application of the brakes and upon the release of fluid under pressure therefrom to effect the release of the brakes, means providing a communication through which fluid under pressure is supplied to and released from the fluid pressure operated means, wheel-slip responsive means, a valve device controlled by the wheel-slip responsive means for controlling the supply of fluid under pressure through the communication to the fluid pressure operated means and the release of fluid under pressure from the fluid pressure operated means through the communication, means for delaying the supply of fluid under pressure through the communication from the valve device to the fluid pressure operated means for a limited time following the initial supply of fluid under pressure into the communication, and additional means whereby fluid under pressure may be released without delay from the fluid pressure operated means through the said communication in by-passing relation to said delaying means.

7. A vehicle brake equipment comprising fluid pressure operated means operated upon the supply of fluid under pressure thereto to effect application of the brakes and upon the release of fluid under pressure therefrom to effect release of the brakes, means providing communication through which fluid under pressure is supplied to and released from the fluid pressure operated means, wheel-slip responsive means, a valve device controlled by the wheel-slip responsive device for controlling the supply of fluid under pressure through the communication to the fluid pressure operated means and the release of fluid under pressure from the fluid pressure operated means through the said communication, a valve interposed in the communication between the said valve device and the fluid pressure operated means normally effective to prevent the supply of fluid under pressure to the fluid pressure operated means, means for effecting operation of said valve a certain limited time after the supply of fluid under pressure into the communication as initiated, and a one-way valve in said communication in parallel relation to the said valve effective to prevent the supply of fluid under pressure there-past to the fluid pressure operated means and arranged to permit the immediate release of fluid under pressure through the said communication from the fluid pressure operated means.

8. In a vehicle brake system, the combination of valve means having two chambers and operative whenever one of said chambers is charged with fluid at a given pressure for effecting a certain degree of application of the brakes and when the other of said chambers is charged with fluid at the given pressure while the said one chamber is not charged with fluid under pressure for effecting application of the brakes to a degree different from said certain degree, means effective at one time to establish communication through which fluid under pressure is supplied to both of said chambers and at another time to establish communication through which fluid under pressure is supplied to only the said other chamber, and additional means for delaying the supply of fluid under pressure to the said other chamber for a limited time following the operation of the last said means to supply fluid under pressure thereto.

9. In a vehicle brake system, the combination of valve means having two chambers and operative whenever one of said chambers is charged with fluid at a given pressure for effecting a certain degree of application of the brakes and when the other of said chambers is charged with fluid at the given pressure while the said one chamber is not charged with fluid under pressure for effecting application of the brakes to a degree different from said certain degree, means effective at one time to establish communication through which fluid under pressure is supplied to both of said chambers and at another time to establish communication through which fluid under pressure is supplied to only the said other chamber, a valve device normally effective to prevent the supply of fluid under pressure through the communication to the said other chamber, and means effective a certain limited time after the said means operates to establish communication for the supply of fluid under pressure to only said other chamber for causing operation of said valve device to permit the flow of fluid under pressure to the said other chamber.

10. In a vehicle brake system, the combination of valve means having two chambers and operative whenever one of said chambers is charged with fluid at a given pressure for effecting a certain degree of application of the brakes and when the other of said chambers is charged with fluid at the given pressure and the said one chamber is not charged with fluid under pressure for effecting application of the brakes to a degree different from said certain degree, wheel-slip responsive means, means controlled by the wheel-slip responsive means and effective at one time to establish communication through which fluid under pressure is supplied to both of said chambers and effective at another time to establish communication through which fluid under pressure is supplied to only said other chamber, and additional means for preventing the supply of fluid under pressure through the communication to the said other chamber for a certain limited time after the last said means operates to cause fluid under pressure to be supplied to said other chamber.

11. A vehicle brake equipment comprising fluid pressure operated means operative upon the supply of fluid under pressure thereto to effect application of the brakes and upon the release of fluid under pressure therefrom to effect release of the brakes, a normally uncharged pipe chargeable with fluid at different pressures, a valve device normally in a position to establish communication through which fluid under pressure is supplied from said pipe to the fluid pressure operated means and operative to a different position to close said communication and vent fluid under pressure from the fluid pressure operated means, means effective upon deceleration of the vehicle wheel in slipping to effect operation of said valve device to its said different position and upon acceleration of the vehicle wheel toward vehicle speed while slipping to cause the valve device to be returned to its normal position, and means interposed in the communication between the valve device and the fluid pressure operated means for inhibiting for a limited time the supply of fluid under pressure to the fluid pressure operated means.

12. A vehicle brake equipment comprising fluid pressure operated means operative upon the supply of fluid under pressure thereto to effect application of the brakes and upon the release of fluid under pressure therefrom to effect release of the brakes, a normally uncharged pipe chargeable with fluid at different pressures, a valve device normally in a position to establish communication through which fluid under pressure is supplied from said pipe to the fluid pressure operated means and operative to a different position to close said communication and vent fluid under pressure from the fluid pressure operated means, means effective upon deceleration of the vehicle wheel in slipping to effect operation of said valve device to its said different position and upon acceleration of the vehicle wheel toward vehicle speed while slipping to cause the valve device to be returned to its normal position, and valve mechanism interposed in the communication between the valve device and the fluid pressure operated means for preventing the supply of fluid under pressure to the fluid pressure operated means for a certain limited time after the valve device operates to supply fluid under pressure into the communication and effective to permit the instantaneous release of fluid under pressure from the fluid pressure operated means through the communication.

13. In a vehicle brake equipment, the combination of valve means comprising two chambers and operative whenever one of said chambers is charged with fluid at a given pressure to effect a certain degree of application of the brakes and when the other of said two chambers is charged with fluid at the given pressure and the said one chamber is not charged with fluid under pressure for effecting a degree of application of the brakes less than said certain degree, brake control means operative to cause fluid under pressure to be supplied to both of said chambers to cause operation of the valve means to effect application of the brakes, means effective upon deceleration of the vehicle wheel while slipping to cause the release of fluid under pressure from both of said chambers independently of the brake control means whereby to effect the release of the brakes and conditioned upon acceleration of the vehicle wheel toward vehicle speed while slipping to cause fluid under pressure to be resupplied to only the said other of said chambers, and pneumatic timing means effective to delay the resupply of fluid under pressure to the said other chamber for a limited time after the last said means becomes conditioned to cause the resupply of fluid under pressure to the said other chamber.

14. In a vehicle brake equipment of the type having a fluid pressure controlled means for effecting application and release of the brakes associated with a vehicle wheel and means responsive to the slipping of the wheel during an application of the brakes for causing fluid under pressure to be released from and then resupplied to the fluid pressure controlled means to cause it to effect first the release and then the reapplication of the brakes associated with the wheel, the combination of a valve device normally preventing the supply of fluid under pressure to the fluid pressure controlled means, and timing means for preventing operation of the valve device to permit fluid under pressure to be resupplied to the fluid pressure controlled means until a certain limited time has elapsed following the operation of the wheel slip responsive means to cause the resupply of fluid under pressure to the fluid pressure controlled means.

ELLERY R. FITCH.